US008639603B2

(12) United States Patent
Denning et al.

(10) Patent No.: US 8,639,603 B2
(45) Date of Patent: Jan. 28, 2014

(54) SYSTEM AND METHOD FOR CREATING AND ADMINISTERING INSURANCE VIRTUAL AFFINITY GROUPS (71) Applicant: Hartford Fire Insurance Company, Hartford, CT (US)

(72) Inventors: Ryan Owen Denning, West Hartford, CT (US); Mushter Munib Moin, Newington, CT (US); Deborah L. Perschy, Southington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/712,435

(22) Filed: Dec. 12, 2012

(65) Prior Publication Data
US 2013/0339064 A1 Dec. 19, 2013

Related U.S. Application Data (60) Provisional application No. 61/659,749, filed on Jun. 14, 2012.

(51) Int. Cl.
G06Q 40/00 (2012.01)

(52) U.S. Cl.
USPC .................................. 705/35; 705/4

(58) Field of Classification Search
USPC ................................. 705/35–40, 4
See application file for complete search history.

(56) References Cited

U.S. PATENT DOCUMENTS

| 8,306,874 | B2 | 11/2012 | Morgenstern et al. |
| 8,340,983 | B2 * | 12/2012 | Grover et al. ............ 705/4 |
| 2011/0137975 | A1 | 6/2011 | Das et al. |
| 2012/0296731 | A1 | 11/2012 | Ross |

* cited by examiner

Primary Examiner — Thu Thao Havan
(74) Attorney, Agent, or Firm — Howard IP Law Group, PC (57) ABSTRACT Pursuant to some embodiments, systems, methods, apparatus and computer program code for creating and administering virtual affinity groups are provided. Pursuant to some embodiments, a computer implemented processing method is provided which includes receiving, at an insurance processing platform, information identifying at least a first characteristic of a virtual affinity group, receiving, at the insurance processing platform, information identifying at least a first feature of the virtual affinity group and at least a first insurance related benefit to be offered to the virtual affinity group, automatically identifying at least a first individual matching the at least first characteristic, and communicating to the at least first individual information allowing the at least first individual to participate in the virtual affinity group.

20 Claims, 5 Drawing Sheets

SYSTEM AND METHOD FOR CREATING AND ADMINISTERING INSURANCE VIRTUAL AFFINITY GROUPS

CROSS REFERENCE TO RELATED APPLICATIONS

This application is based on, and claims benefit of and priority to U.S. Provisional Patent Application Ser. No. 61/659,749 filed on Jun. 14, 2012, the contents of which are hereby incorporated herein by reference in their entirety for all purposes.

BACKGROUND

Advances in computing and data processing have led to the creation of large sets of data about consumers and their interests. The data includes information from a wide variety of sources, including postal data, census and demographic data, and increasingly, data accumulated via user interaction with social media and other Websites such as Facebook®, Twitter®, Internet forums, question and answer sites (such as StackExchange®), and the like.

Frequently, this interaction data can be matched to a specific individual or business. Advertisers currently use some data to target advertising to individuals based on their interests. For example, Google® provides tools for advertisers to place keyword and demographically-targeted ads on Web pages which are considered to be relevant to consumers based on their search terms and based on their location and other demographic information.

Many consumers affirmatively take steps to join and participate in groups that provide information or benefits based on shared characteristics of a group. For example, many consumers who are retired or near retirement age join (and pay a monthly or annual fee to) the AARP. Membership in such a traditional group provides a number of benefits to consumers who join, including discounts on certain products as well as information of interest to consumers who share the characteristic of being at or near retirement age. Unfortunately, however, participation requires that a consumer proactively seek out and obtain a membership in the group.

Individuals and businesses often search for, comment on, and interact with topics of interest that either involves insurable assets (such as automobiles, motorcycles, homes, electronics, or the like) or that could provide information to insurance underwriters regarding the insurability of the individual or business. It would be desirable to use information from such searches, comments and interactions to provide insurance related offers and information to such individuals or businesses.

DETAILED DESCRIPTION

Pursuant to some embodiments, systems, methods, apparatus and computer program code for creating and administering virtual affinity groups are provided. Pursuant to some embodiments, a computer implemented processing method is provided which includes receiving, at an insurance processing platform, information identifying at least a first characteristic of a virtual affinity group, receiving, at the insurance processing platform, information identifying at least a first feature of the virtual affinity group and at least a first insurance related benefit to be offered to the virtual affinity group, automatically identifying at least a first individual matching the at least first characteristic, and communicating to the at least first individual information allowing the at least first individual to participate in the virtual affinity group. In some embodiments, the at least first characteristic of the virtual affinity group is selected from a known aggregated group of insurance characteristics. For example, the at least first characteristic may be a demographic or psychographic attribute of consumers or businesses that are known or predicted to possess a desired insurance risk profile. The aggregated group of insurance characteristics may be obtained from insurance underwriting data, existing or predicted loss and claim data, or the like. In some embodiments, the at least first characteristic is selected as a seed or starting point for the creation of a virtual affinity group and additional characteristics may be identified to further refine the participants in the virtual affinity group.

As used herein, the term "virtual affinity group" refers to a group of one or more individuals or entities that have been identified as matching one or more eligibility criteria or characteristics (e.g., such that the individuals or entities possess a common "affinity" or interest). The group is referred to as being "virtual" in that the relationship between the individuals or entities need not be physical or defined other than based on their common affinity or interest.

Prior to discussing features of some embodiments, an illustrative (but not limiting) example will be provided. This example will be referenced throughout the remainder of this specification to assist in describing features of some embodiments. In the illustrative example, an operator or administrator of a system pursuant to the present invention has identified (either automatically by operation of the system or otherwise) that car enthusiasts with certain criteria are desirable insurance prospects. More particularly, for the purposes of the illustrative example, it has been determined that there are a number of enthusiasts who are interested in (or have) Audi A4 automobiles. These enthusiasts express their interest by searching the Internet using keywords such as "Audi A4", "Audi A4 forum", "Audi A4 mods", etc. Further, these enthusiasts visit Internet sites such as Audiworld.com, Audiforums.com and the like, and many of the enthusiasts post comments on those sites. Further, many of the enthusiasts express their interest in Audi A4 automobiles by "liking" Audi A4 on Facebook® or other social networking sites or by including "Audi A4" (or variants thereof) in their profile on various sites.

In the illustrative example, an operator or administrator of a system of the present invention establishes characteristics for an Audi A4 virtual affinity group. The characteristics may include criteria for inclusion in the affinity group. The criteria may include demographic criteria (for example, the individual must be located in the United States, or even a region within the United States), socio-economic criteria (e.g., the individual must be located in an area that has, or otherwise be known to have, an annual household income greater than $100,000), and an interest level (e.g., as measured by the quantity, quality and/or nature of their comments, posts, and searches for topics relating to Audi A4 automobiles). In the illustrative example, at least a first of the characteristics is identified based on existing insurance data that is known or predicted to provide a desired insurance risk profile (e.g., it may be known that the aggregated group that consists of individuals residing in certain geographical areas and who have an annual household income greater than $100,000 present a desired insurance risk profile for certain types of personal lines insurance policies).

Once one or more characteristics have been established, the operator or administrator may establish content and features of the virtual affinity group. In some embodiments, this may include establishing a separate web property associated with the group (which may be an automatically generated subdomain or top level domain) as well as establishing content and content sources for the virtual affinity group. The content and content sources may include informative articles or other items of content of specific interest to a group of Audi A4 aficionados. Further, the web property may include interactive features (such as a forum, the ability to ask questions, provide answers, upload pictures, or the like). The web property may also include an aggregation of content and other information from other sources (e.g., via RSS or other feeds of data). The operator or administrator may also define one or more insurance-related offers or benefits to provide to members of the virtual affinity group. For example, an automobile policy (or set of policies) may be created or tailored to Audi A4 owners (or prospective owners).

Once the web property and insurance-related offers or benefits have been defined, the operator or administrator may trigger or launch a process which identifies eligible individuals. This process may run continuously or periodically to identify new individuals. Eligible individuals may be those individuals who meet the criteria established by the operator or administrator (e.g., pursuant to the example, anyone living in the U.S. who has an annual household income greater than $100,000 and who expresses a high level of interest in Audi A4 automobiles may be an eligible individual). Once identified, those individuals may be invited or encouraged to join the Audi A4 virtual affinity group through: advertisements for the virtual affinity group, targeted emails, postal mail, or the like. An individual who wishes to participate may then visit the web property associated with the virtual affinity group and enjoy the content and features of the web property, as well as the insurance-related benefits created for the group. In some embodiments, no web property need be created—instead, the group may simply consist of qualified members who are eligible to receive insurance related benefits and offers. As will be described further below, such virtual affinity groups may also be private or anonymous such that an eligible individual need not take any action to enjoy the insurance-related benefits.

As another illustrative, but not limiting, example, an insurance company may identify that physically active males between the age of 35 and 45 present a desirable insurance profile (based on an analysis of existing claim and loss data). A virtual affinity group may be established based on that information and physically active males in that age range may be identified by analyzing data from a wide variety of sources, including data from users of exercise sensors (such a that provided by Fitbit® or the like), data from social networks and the like. Such further analysis may result in the addition of further data sources to identify individuals for participation in the virtual affinity group and/or the addition of further characteristics to further refine the definition of the group.

For example, it may be determined that participants of a virtual affinity group consisting of active males between the age of 35 and 45 may be identified by analyzing specific additional types of social data. For example, it may be determined that many of these physically active males frequently post information about their workouts or activities on sites such as Crossfit.com, RunKeeper.com or the like or share exercise and fitness data using a fitness API such as that provided by Fitbit®. As a result, the data collection systems for this virtual affinity group may be expanded to include monitoring and analysis of these sites and data sources. Further analysis of the virtual affinity group may also result in the identification of additional desired characteristics of the group. For example, it may be determined that physically active males between the age of 35 and 45 who walk at least 10,000 steps each day or who take part in Crossfit workouts an average of 3 times a week are highly desirable insurance prospects. The characteristics of the virtual affinity group may be modified to include these additional characteristics (or new virtual affinity groups may be created which include these additional characteristics) and data collection and identification tools may be modified to identify individuals possessing these characteristics.

Further details, and features and advantages of virtual affinity groups will become apparent upon reading the following detailed description. Features of some embodiments will now be described by first referring to FIG. 1 which is a block diagram of an processing platform 100 according to some embodiments of the present invention. The platform 100 may, for example, facilitate the creation and administration of virtual affinity groups using demographic, search, community, social and business network based data such as information published by individuals or businesses (e.g., via Twitter, Facebook, Google+, or the like), as well as information shared by individuals or businesses via searches, comments, postings, or the like. For illustrative, but not limiting, purposes such information may be published by sites or networks including ebay.com, Facebook.com, LinkedIn.com, Twitter.com, Blogger.com, MySpace.com, Friendster.com, Google+, Youtube, Pinterest and other similar sites. Information may also be obtained from applications (such as those provided through the Apple® store, the Android® marketplace or the like) and devices (such as mobile phones, navigation systems, desktop computers or the like). Information may also be obtained from monitoring or telematics devices. For example, fitness and health data may be obtained from wireless-enabled scales (which measure and provide data regarding weight and body mass), wearable devices that measure data such as the number of calories expended, the number of steps walked, the quality of sleep, or the like. Such data may be obtained from one or more data repositories such as those provided by Fitbit® or the like. For clarity and ease of exposition, individuals and businesses using features of the present invention to receive insurance services and information may generally be referred to herein as "consumers" or "individuals".

Figure 1:
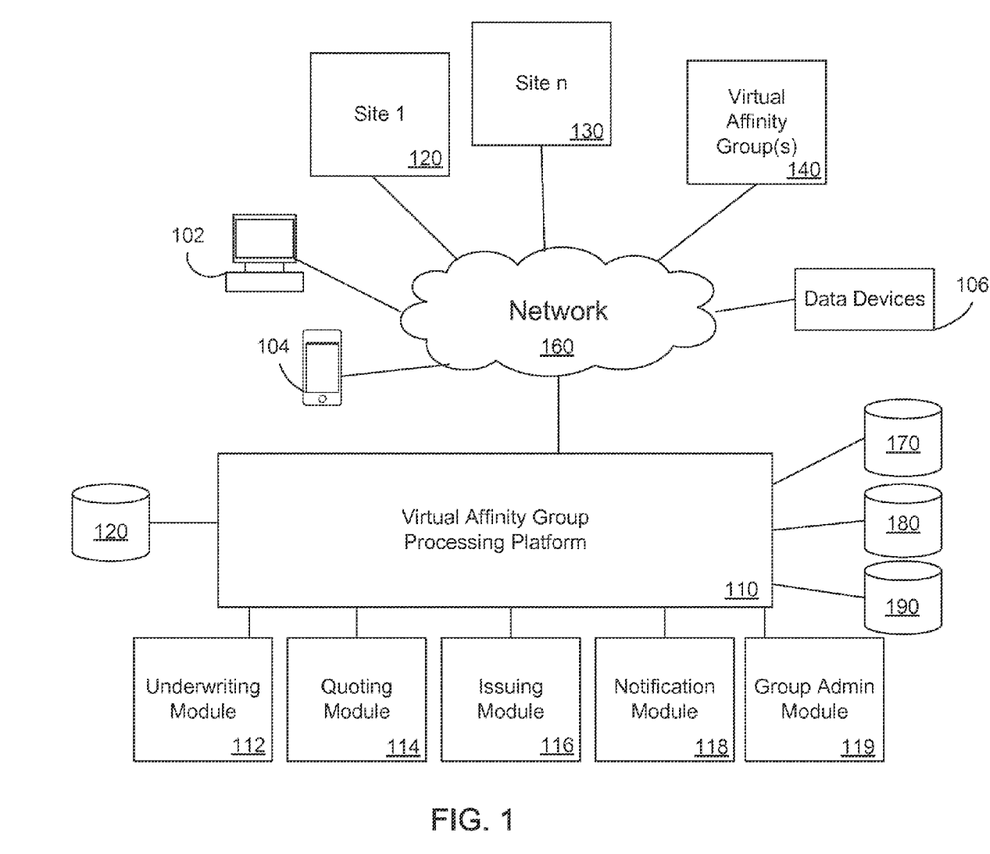
FIG. 1 is block diagram of a system according to some embodiments of the present invention.

According to some embodiments, a virtual affinity group processing platform 110 may be provided for establishing, identifying, notifying, and otherwise administering virtual affinity groups based on data from a variety of sources, including social network sites, operator entry, Websites, or the like. By way of example only, the virtual affinity group processing platform 110 may be associated with and/or communicate with (or receive information about) customers, prospects, or other individuals and entities operating a variety of devices, including, for example, personal computers 102 (including desktop, laptop, tablet, or other types of computers), mobile devices 104 (such as mobile telephones), and other data devices 106 (such as sensors, networked devices, or the like).

In embodiments described herein, the virtual affinity group processing platform 110 may be operated to both establish and maintain virtual affinity groups, but also to perform a number of insurance-related activities, including the pricing, underwriting, issuance, administration and support of a number of different types of insurance policies, including personal lines, workers compensation, health, group benefits, and other commercial policies. Pursuant to some embodiments, virtual affinity group processing platform 110 receives data from a wide variety of sources including one or more social media or other websites or properties 120-130 and devices 102, 104, 106. The data received is used to enhance interactions with consumers and insured individuals and businesses. Further, virtual affinity group processing platform 110 may transmit data and notifications to consumers and insured individuals and businesses directly to devices 102, 104 or 106 or through one or more social media sites 120-130.

Further, pursuant to some embodiments, virtual affinity group processing platform 110 may cause the creation, maintenance, and updating of one or more virtual affinity groups 140 which are created as described herein. Those virtual affinity groups 140 may be created using platforms such as one or more existing social media sites 120-130 (e.g., a virtual affinity group such as the Audi A4 group described above, may include information hosted on a Facebook® page) or other web platforms (e.g., the Audi A4 group may include a Wordpress® powered website hosted on a subdomain or primary domain), or the like. For example, in one illustrative embodiment, an insurance company may use the infrastructure of an existing social network (such as those provided by Facebook® or Google+®) to create virtual affinity groups for eligible individuals.

While a virtual affinity group pursuant to the present invention may include the use of a content platform allowing participants to interact with the group, such content is not required. For example, in some embodiments, virtual affinity groups may be created which do not include created or other generated content. Instead, the virtual affinity group consists of individuals who share one or more characteristics of the group and those individuals are flagged or identified by the insurance processing platform 100 as being members of the group. Participation or inclusion in the group may provide the members with one or more insurance-related benefits (such as eligibility for reduced insurance rates, pre-qualification for one or more insurance products, or the like).

As used herein, devices including those associated with the virtual affinity group processing platform 110, and any other device described herein may exchange information via any communication network 160 which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Sites 120-130 may store, publish or otherwise provide access to information about consumers. For example, a consumer with a Facebook account may post status updates, information and comments to Facebook, and Facebook may publish or otherwise make the status updates, information or comments available to authorized individuals or entities. In some embodiments, one or more of the sites 120-130 may publish or otherwise disseminate the information via an application programming interface ("API"), an RSS feed, or some other structured format. For example, for virtual affinity groups that use fitness or health data as a potential characteristic, data from a fitness-related API such as that provided by Fitbit may be analyzed. The information may be analyzed or used by the virtual affinity group processing platform 110 on an individual item basis or on an aggregate basis with other information. Further the data may be combined with one or more other data sources, such as publicly available data provided by the U.S. Census Bureau or the like. Pursuant to some embodiments, data collected about individuals may be indexed to aggregate data across a wide variety of data sources as well as to de-identify any personally identifiable information. For example, a record about a consumer may include a non-personally identifiable identifier used to associate information about the consumer such as name, address, one or more social media user names, telephone numbers, email addresses, with information associated with characteristic data collected pursuant to the operation of the present invention.

As shown, the virtual affinity group processing platform 110 may include a number of modules or components, including one or more underwriting modules 112, quoting modules 114, issuing modules 116, notification modules 118 and group administration module 119. Virtual affinity group processing platform 110 may be deployed as a number of different platforms in communication with each other (for example, one processing platform may be deployed as a virtual affinity group administration platform, while another may be deployed to function as benefit issuance platform). Pursuant to the present invention, the notification modules 118 may be used to transmit information to eligible individuals, to service providers, and to other entities, including information relating to one or more virtual affinity groups established pursuant to the present invention. In some embodiments, one or more group administration modules 119 may be provided to receive data associated with different virtual affinity groups, including information used to create and maintain one or more virtual affinity groups.

As will be described further below, the underwriting modules 112 may be used in conjunction with the creation and updating of one or more rating schedules for use in pricing and rating insurance policies or in creating insurance benefits or other offers for virtual affinity groups pursuant to embodiments of the present invention. For example, in some embodiments, the underwriting modules 112 are used to analyze both conventional underwriting data such as historical loss information in conjunction with social and business network based data for use in rating and pricing business insurance policies.

Referring still to FIG. 1, the quoting and issuing modules 114 and 116 may be used in conjunction with the quoting, rating and pricing of insurance policies (e.g., in response to requests for quotes received from participants in virtual affinity groups). Note that the underwriting module 112, quoting module 114, and/or issuing module 116 may be associated with various types of insurance policies, including automobile and home insurance policies, for individuals and/or companies.

Although a single virtual affinity group processing platform 110 is shown in FIG. 1, any number of such devices may be included. Moreover, various devices described herein might be combined according to embodiments of the present invention. For example, in some embodiments, the virtual affinity group processing platform 110 and modules 112-119 might be co-located and/or may comprise a single apparatus.

The virtual affinity group processing platform 110 and the modules 112-119 may also access information in one or more databases 170, 180 and 190. The databases may include, for example, risk characteristic data 170, historical loss data 180 associated with previously-issued insurance policies, and policy data 190 associated with active policies. As will be described further below, the policy data 190 may be used to process information associated with virtual affinity groups established pursuant to the present invention and to provide insurance related offers (and process insurance requests) from individuals associated with virtual affinity groups. The data from such data sources may be used to identify one or more starting aggregated groups that are used to identify one or more characteristics for the creation of a virtual affinity group. For example, pursuant to some embodiments, a data mining and analysis process may be performed to identify desired characteristics for a virtual affinity group from underwriting and loss data (e.g., obtained from data sources 170-190).

Figure 2:
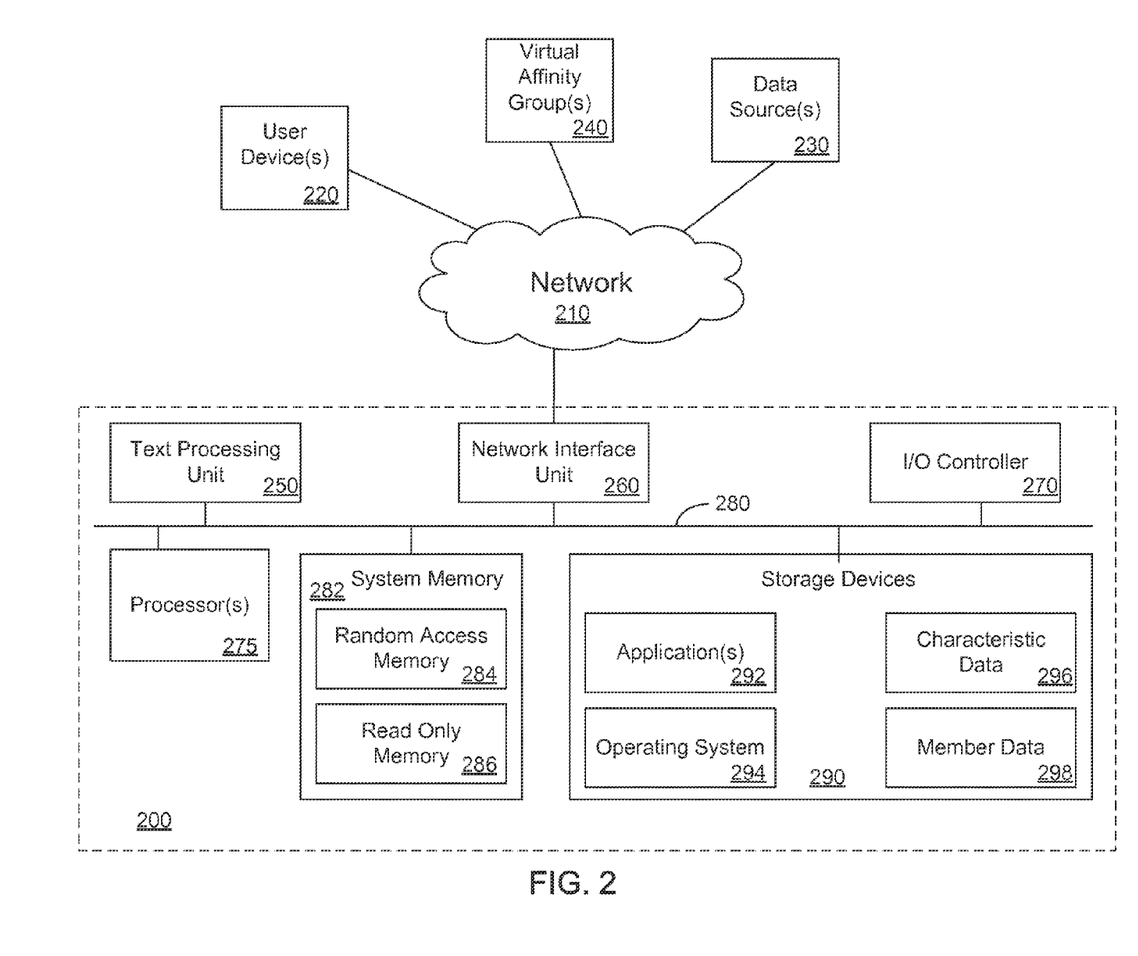
FIG. 2 is block diagram of a system according to some embodiments of the present invention.

Referring now to FIG. 2, one embodiment of the present invention is shown for generating and administering virtual affinity groups for use in providing targeted offers of insurance, insurance renewal information, or other insurance related information. As shown in FIG. 2, the virtual affinity group processing platform 200 communicates via network 210 to send data to, and receive data from, a plurality of user devices 220 (such as mobile phones, computers, or the like), a plurality of data sources 230 (such as social networking sites, public data sources, or the like), and a plurality of virtual affinity groups 240 to enable an insurance company to generate and administer virtual affinity groups for use in providing insurance-related offers and information.

Platform 200 also may include a number of devices or components, including computer processor(s) 275 and text processing units 250. The computer processor 275 and the text processing unit 250 may include one or more conventional microprocessors and may operate to execute programmed instructions to provide functionality as described herein. Among other functions, the computer processor 275 and/or the text processor 250 may access and retrieve information from data source(s) 230 via network interface unit 260 and input/output controller 270 via system bus 280.

Data identifying one or more desired characteristics may be stored in a data store 296. The characteristic data may be obtained from one or more data modeling or analytic processes based on existing insurance information. For example, an insurance modeling process may identify certain characteristics as providing a desirable insurance risk profile. Information identifying such characteristics may be stored in data store 296 and used in the creation of a virtual affinity group of individuals possessing the characteristic. In some embodiments, additional characteristic data may be added as further attributes of a virtual affinity group become known. The characteristic data is then used to identify individuals who possess the characteristic.

For example, in a mode of operation in which the virtual affinity group processor is operated to identify eligible individuals for participation in a virtual affinity group (such a the Audi A4 group introduced above as an illustrative example), the text processor 250 may be operated to scan existing forums, social media sites, and other web sites to analyze data associated with individuals interested in Audi A4 automobiles. The data analyzed may include forum posts, comments, Web blog posts, images, preferences (such as preferences or profile data associated with user accounts on sites such as Google+, Facebook, or the like), Twitter posts, etc. The text processor 250 may be programmed to identify different types of statements or comments that are relevant to the virtual affinity group. For example, natural language processing techniques may be used to mine certain characteristic information based on the characteristics of the virtual affinity group to determine whether an individual is eligible to participate in the virtual affinity group.

Pursuant to some embodiments in which the virtual affinity group is established with a high level of interest required for participation in a group, different weightings of types of data may be established and used when mining data. For example, if the Audi A4 virtual affinity group is created to only allow participation by individuals owning an Audi A4 who exhibit a level of interest that tends to suggest that those individuals would be a low insurance risk, the text processor 250 may be programmed to weight certain types of comments more heavily. As a specific illustrative example, it may be determined that individuals who actively maintain and care for their cars present a lower insurance claim risk. As such, the text processor 250 may be programmed to give greater weight to comments associated with Audi A4 maintenance. Individuals who post frequent quality comments on an Audi A4 maintenance forum would be more likely to be invited to participate in the virtual affinity group than individuals who do not.

Other parameters, criteria and inputs may be provided to control the text processor 250 to collect and analyze data such that only eligible individuals are identified for participation in virtual affinity groups. For example, individuals who are frequent commenters or posters on certain types of authority sites may be targeted. Authority sites may be identified using any of a number of different criteria. For example, Google's PageRank system may be used to identify credible or authority sites (where sites having a higher PageRank may be considered more credible than sites with lower PageRank scores). As another example, relative traffic data between different sites may also be used to assess the authority of sites (for example, a site with a higher number of monthly page views may be considered to be more authoritative than a site with a low number of monthly page views).

Other indicia of an individual's engagement or interest level may also be used. For example, certain Web sites rank commenters or participants and categorize the reputation of individual participants based on how much the community trusts the individual's knowledge on a topic, communication skills, and the quality and relevancy of the individual's questions and answers and participation. For example, Stackexchange.com and other similar sites provide badges indicating the reputation level of each participant. A participant with a high number of quality and knowledgeable comments on a topic may be classified as a "Super User". Such indicators of an individual's quality and quantity of engagement on a topic may be used to characterize the individual's level of interest and expertise in an area and may be used as a characteristic or criteria for inclusion in a virtual affinity group pursuant to some embodiments.

The virtual affinity group processing platform 200 may further include a program memory 282 that is coupled to the computer processor 275. The program memory 282 may include a random access memory 284 and a read only memory 286. System memory 282 is further coupled via bus 280 to one or more fixed storage devices 290, such as one or more hard disk drives, flash memories, tape drives or other similar storage devices. Storage devices 290 may store one or more application programs 292, an operating system 294, and one or more databases such as a characteristic database 296 for storing data identifying characteristics or criteria that are used to determine which individuals are eligible for participation in a virtual affinity group. For example, characteristics or criteria may include: geographic data (e.g., data identifying where an individual must reside to participate), demographic data (e.g., income, gender, age, or other data required for eligible individuals), engagement data (e.g., information identifying a quantity and/or quality of interest data needed to be considered eligible for participation), or the like. Other attributes may also be analyzed to determine whether an individual is eligible for participation in a group. For example, statements, postings or other comments (generally referred to herein as "comments") made by an individual may be positively correlated with risk based on the nature of those comments or may be weighted differently than other comments by that individual. As an example, comments with low sentence complexity, inappropriate language, or poor grammar may be given less weight than comments with high sentence complexity and spelling accuracy. Platform 200 may also include a member database 298 for storing data associated with a plurality of individuals identified as eligible for participation in the virtual affinity group. For example, the member database 298 may include information identifying individuals by name, address, phone number, IP address, or the like. In some embodiments, members may be further identified using one or more unique codes or identifiers used to permit access to the virtual affinity group.

Platform 200 may be, according to some embodiments, accessible via a Graphical User Interface (GUI) rendered at least in part by input/output controller 270. The GUI might be used, for example, to dynamically display information associated with virtual affinity groups, as well as the administration of those groups. For example, in some embodiments, a user interface such as that shown and described below in conjunction with FIG. 5 may be provided as a portal or page for members of a virtual affinity group to obtain information and benefits provided as a result of their participation in a virtual affinity group. In some embodiments, participation in a virtual affinity group need not include access to such a portal or page for members; instead, participation may be automatic once an individual is determined to possess the requisite characteristics of the group.

Referring still to FIG. 2, the platform 200 performs processing to receive, process and extract relevant information from data source(s) 230 (such as social network data, search queries, blog comments, forum posts, etc.). The processing and extraction of information from the data source(s) 230 may take one or more of a number of different forms. For example, the processing platform 200 may monitor or search for activity associated with certain defined characteristics associated with one or more virtual affinity groups. In the illustrative example, the platform 200 may be operated to search for activity associated with "Audi A4" searches, comments or posts to identify potential participants in a virtual affinity group for Audi A4 enthusiasts. As another example, the processing platform 200 may perform actions to invite or encourage such identified individuals to participate in an established virtual affinity group. As another example, the processing platform 200 may perform one or more insurance—related actions to underwrite, quote or issue insurance products for participants in a virtual affinity group. Other examples will be introduced in the embodiments described below. The search and processing of processing platform 200 may involve the use of natural language processing techniques to determine whether certain search, posting, or other activities of consumers contain, in substance, information relevant to one or more virtual affinity groups.

It is contemplated that the processing platform 200 may process data and information in one or more languages, such English, French, Arabic, Spanish, Chinese, German, Japanese and the like. In an exemplary embodiment, underwriting analysis by the platform 200 also can be employed for sophisticated text analyses, wherein text can be recognized irrespective of the text language. The relationships between the various words/phrases can be clarified by using an insurance rules engines for classifying words/phrases as a predictor of certain underwriting risk or as a predictor of intent or interest (e.g., to determine whether an individual should be eligible for participation in a virtual affinity group).

Figure 3:
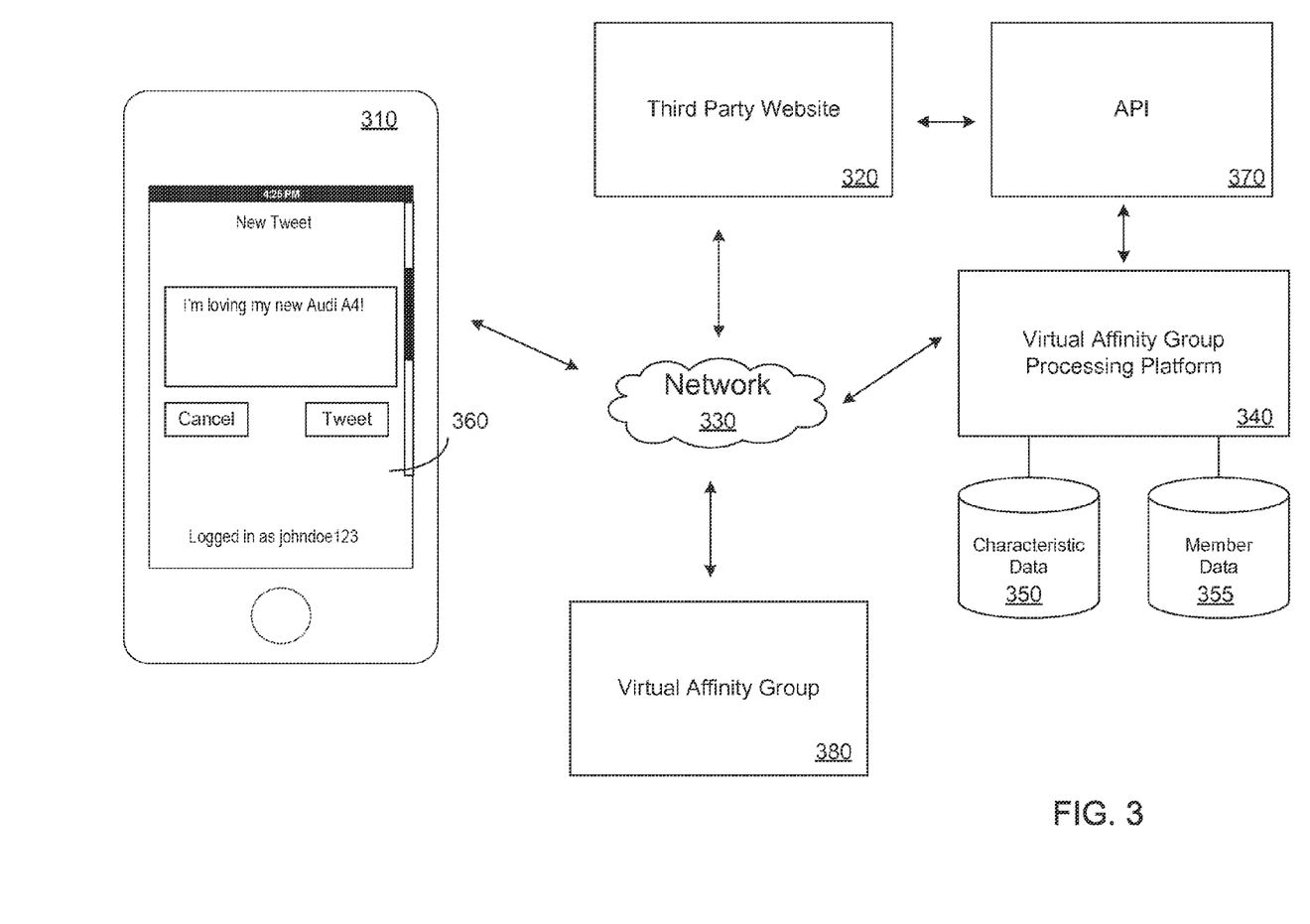
FIG. 3 is block diagram of a system according to some embodiments of the present invention.

Reference is now made to FIG. 3, in which an embodiment of a system 300 configured to identify eligible individuals for participation in a virtual affinity group is shown. As shown, system 300 includes a mobile device 310 operated by an individual. The individual is shown operating the mobile device 310 to post a "tweet" on twitter.com using his Twitter account ("johndoe123"). The tweet is a message announcing that the individual is "loving my new Audi A4", and sending the message will cause a website 320 (e.g., twitter.com) to post an update associated with johndoe123's Twitter feed with the content of the message. Pursuant to some embodiments, Twitter feeds (as well as data from a variety of other sites and forums) are monitored by the virtual affinity group processing platform 340 to identify messages and posts which meet one or more characteristic data 350 associated with one or more virtual affinity groups. The data from the site 320 may be received and parsed using one or more application programming interfaces ("APIs") 370 which allow data from a large number of different sites to be collected and monitored by the virtual affinity group processing platform 340.

In the illustrative example introduced above, a virtual affinity group for Audi A4 aficionados has been created (shown as item 380). Eligible individuals who may be invited to participate in the virtual affinity group may be identified by monitoring or analyzing posts, comments, messages or other actions taken by those individuals on third party websites (such as twitter.com). In the example shown in FIG. 3, "johndoe123" may be identified as an eligible individual as he has expressed a current interest in Audi A4s. Additional analysis of johndoe123 may be made under control of the virtual affinity group processing platform 340 to determine his eligibility. For example, a single post or comment may not be sufficient to become eligible, and the system may analyze additional comments or posts by johndoe123 to determine whether further interest in Audi A4s has been expressed. Further, information (such as from third party databases) may be used to determine where the individual is located geographically, to determine a demographic profile of the individual, or the like. If the individual is determined to be eligible for participation in the virtual affinity group, a notification of the group may be communicated to the individual inviting participation in the group (e.g., in the illustrative example, johndoe123 may be sent a message over Twitter to invite his participation in the group).

Individuals may create content and interact with third party websites using any of a number of different types of computing devices, including desktop computers, tablet computers, or mobile devices such as the mobile device 310. The mobile device 310 may be any of a number of different types of mobile devices that allow for wireless communication and that may be carried with or by a user. For example, in some embodiments, mobile device 310 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity such as a third party website 320.

Figure 4:
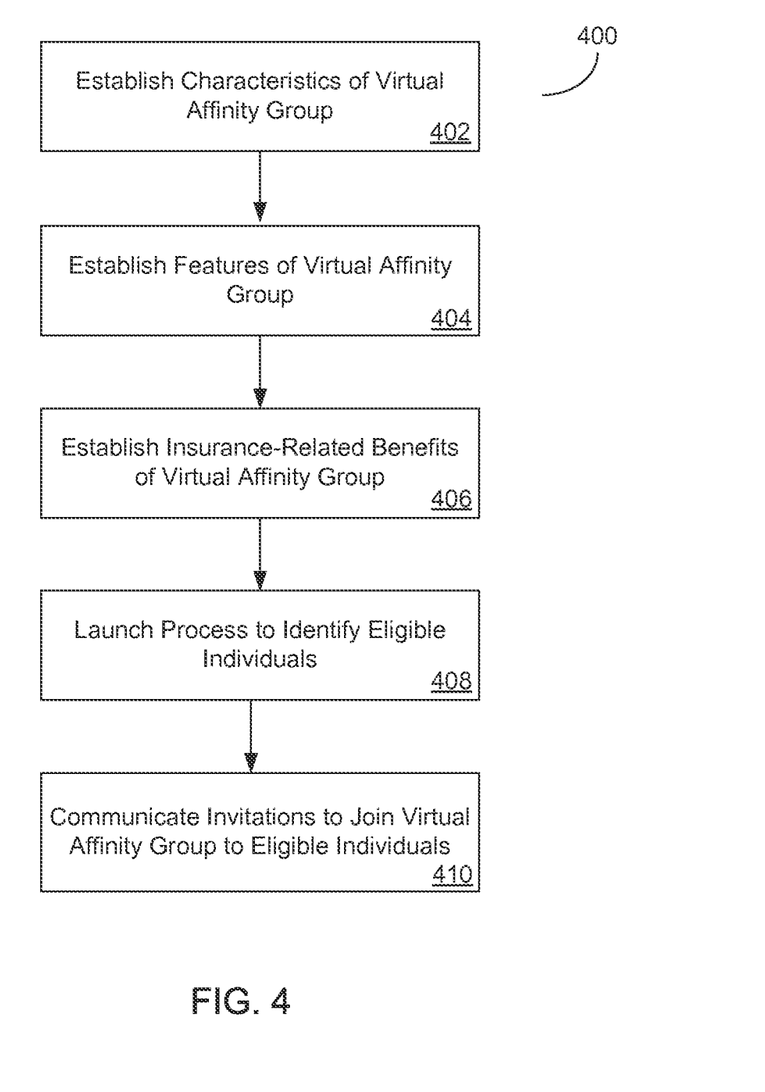
FIG. 4 is a flow diagram of a process according to some embodiments of the present invention.

FIG. 4 is a flowchart of a process 400 for establishing a virtual affinity group pursuant to some embodiments. The process 400 can be performed by the processing platform 110

(as shown in FIG. 1) or a combination of devices as described herein. The process 400 begins at 402 with the establishment of one or more characteristics of a virtual affinity group. The establishment of the characteristics may be performed by an administrator or operator of a system such as the system 100 or it may be an automated process. In embodiments where the establishment is performed by an administrator or operator, processing at 402 may include interaction with a user interface to define characteristics of a virtual affinity group to be created.

Processing at 402 may begin with information from a known set of insurance characteristics such as a aggregated group known to possess a desired insurance risk profile. For example, continuing the illustrative example, processing at 402 may include an operator assigning a virtual affinity group name (such as "Audi A4 Group"), and then selecting or otherwise identifying one or more known characteristics of a aggregated group for inclusion in the virtual affinity group. For example, one of the starting characteristics of the Audi A4 Group may be demographic, geographic or financial characteristics that are known to possess a desired insurance risk profile for automobile insurance. Those known characteristics may be used as a seed or a starting point for an administrator to define the set of characteristics required for participation in the virtual affinity group. The administrator may be presented with a set of characteristics to be selected from one or more predetermined characteristics that may be used across different virtual affinity groups (such as geographical characteristics, demographic characteristics or the like), and/or they may be custom attributes defined for each virtual affinity group. Custom attributes may include characteristics or criteria such as search terms, keywords, sites of interest, or the like. In the illustrative example, processing at 402 may include an operator defining one or more of the following characteristics for inclusion in the Audi A4 Group:

TABLE 1

| Characteristic | Required Values |
| --- | --- |
| Geographic Location | U.S. |
| Income Level | >$100,000 |
| Gender | Male, Female |
| Age | >21 |
| Keywords | Audi, Audi A4, Audi maintenance, Audi repair, Audi accessories |
| Engagement Level | >5 comments within 1 month |

Once the required set of characteristics for inclusion in the virtual affinity group have been established, processing continues at 404 where an operator or administrator of the virtual affinity group defines one or more features of the virtual affinity group. The features may be selected from among a set of predefined templates or may be custom defined for each virtual affinity group. As an example, the features of a virtual affinity group may include features relating to content and information to be provided to participants. In embodiments where the virtual affinity group is one which will provide information to participants, features may also include information used to construct an automated portal or Web site which can be accessed by participants in the virtual affinity group. For example, continuing the illustrative example, features of the Audi A4 Group may include a URL or web address associated with a portal of information including automated information (e.g., collected and displayed using RSS or XML feeds of information), static information (e.g., such as content specifically created for the group), and interactive information (e.g., such as forums, question and answer tools, or the like). The features may cause the display of a user interface such as the user interface shown in conjunction with FIG. 5.

Figure 5:
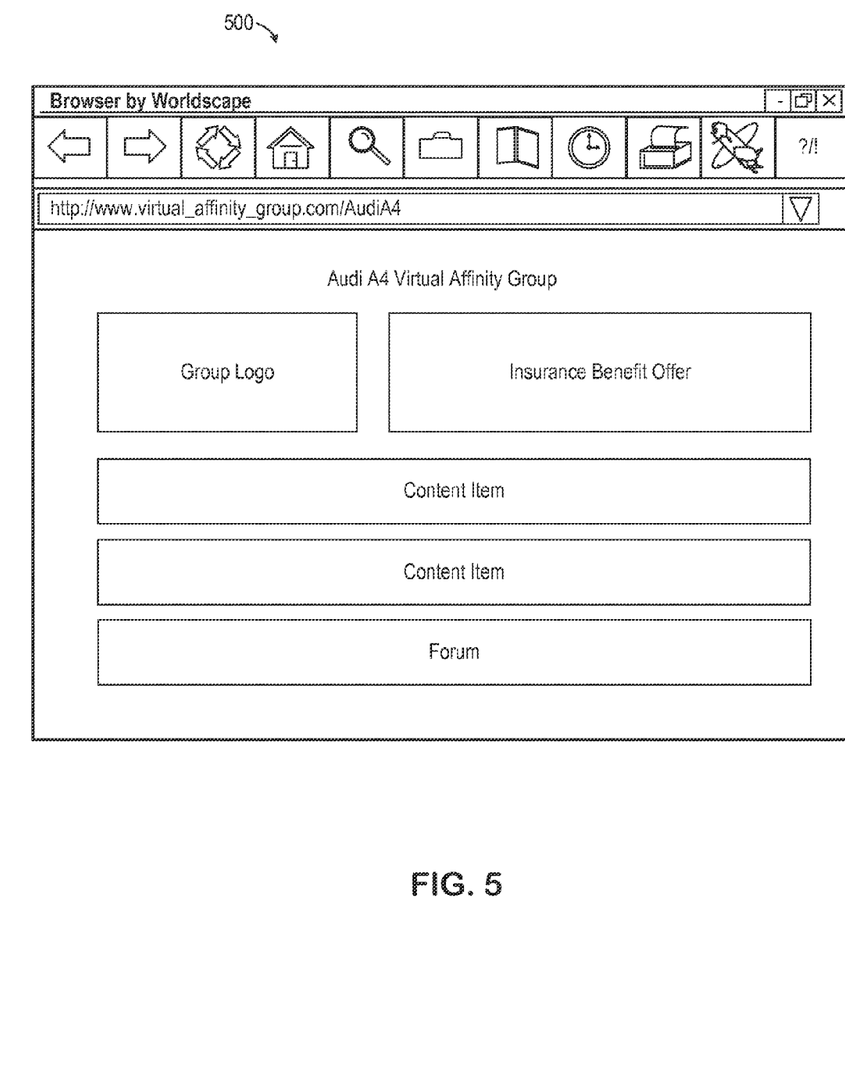
FIG. 5 is a user interface diagram depicting a virtual affinity group user interface according to some embodiments of the present invention.

Referring briefly to FIG. 5, an illustrative user interface 500 is shown which may be associated with a virtual affinity group established by the system of the present invention in embodiments in which participants are encouraged to visit a web site to interact with other participants in the group and view group information, features, and benefits (in other embodiments, no such web property is created—instead, participants are able to enjoy insurance related benefits available to members of the virtual affinity group without visiting such a web property). In the illustrative user interface 500, an example layout of a page is shown which may include a virtual affinity group logo or identifier, an area for one or more insurance benefit offers (e.g., which may be display ads or other forms of presenting an offer), one or more areas for displaying relevant content items (such as curated content, specially written content, or automatically generated or collected content from other sources about topics of interest to members of the virtual affinity group), and one or more areas for displaying interactive content (such as forums, question and answer pages, or the like). In this manner, in some embodiments, highly targeted and relevant content and offers may be presented to participants in the virtual affinity group.

In other embodiments, a portal or set of content may not be provided to participants. Instead, individuals who possess the requisite characteristics may automatically be identified as participants in the group, and any benefits or features of inclusion in the group may be automatically extended to those individuals. For example, an individual who possesses the required characteristics for inclusion in the Audi A4 group may receive the insurance-related benefits automatically. For example, if the individual applies for an automobile insurance policy from the insurance company associated with the Audi A4 group, the individual may be automatically identified as being eligible for the benefits associated with the Audi A4 group and may receive a discount, different pricing, or the like.

Referring again to FIG. 4, processing continues at 406 where one or more insurance-related benefits of the virtual affinity group are established. For example, pursuant to some embodiments, the benefits may include one or more insurance related benefits or offers that are to be provided to the participants in the virtual affinity group. In some embodiments, the insurance related benefits or offers may be designed based on an underwriting or risk analysis performed based on the characteristics established at 402. For example, continuing the illustrative example, the benefits associated with the Audi A4 Group may include one or more insurance benefits designed to appeal to Audi A4 aficionados who have an annual household income in excess of $100,000 and who are over 21 years of age. The insurance benefits may include offers of personal lines insurance targeted to Audi owners or related insurance products. By creating such benefits based on the characteristics of individuals who will be invited to participate in the virtual affinity group, insurance benefits may be designed which closely match the interests of the group and that are priced based on attributes of the group. Insurance offers may thus be created that are priced based on the relative risk of a group of individuals having known characteristics. In some embodiments, the benefits may include group insurance benefits that are targeted to the affinity group.

Processing continues at 408 where a process is launched or initiated to identify eligible individuals for participation in the virtual affinity group. Eligible individuals are identified by applying one or more characteristics (defined at 402) to data collected or otherwise processed by the virtual affinity group processing platform 110. For example, once the characteristics of a group are defined, an automated process may be initiated which searches for information about individuals meeting those characteristics. In the illustrative embodiment, posts, comments, profiles, search queries, and other data may be processed to identify adult individuals in the U.S. who have an annual household income in excess of $100,000 and who have made more than 5 recent comments or posts involving certain keywords associated with "Audi A4" topics. In some embodiments, processing at 408 may be repeated on a daily or more frequent basis to continually identify potential participants in the virtual affinity group. In some embodiments, the process may include further parameters to refine the sources of data to be analyzed. For example, the process may be limited to scanning or analyzing certain web properties (e.g., such as limiting the searches or analysis to data from Facebook, Twitter, Audiforums.com, or the like). Information about individuals who meet the characteristic requirements are stored in a database (such as member database 298).

Processing continues at 410 where the system is operated to communicate invitations to eligible individuals to join or otherwise participate in the virtual affinity group. In some embodiments, the data collected about eligible individuals at 408 includes contact data (such as an email address, physical mailing address, Facebook or Twitter ID, or the like). For eligible individuals that have contact information, processing at 410 may include the generation and transmission of an invitation to participate in the virtual affinity group. In some embodiments, rather than transmitting an invitation to participate, eligible individuals may be presented with a display advertisement (e.g., using ad retargeting or other techniques) to promote their participation in the virtual affinity group. In some embodiments, eligible individuals need not be informed of their eligibility to participate in the virtual affinity group—instead, those individuals are de facto participants in the group based on the determination that they meet the characteristic data for the group.

In embodiments where eligible individuals are notified regarding their eligibility for participation in a virtual affinity group, the notification may be performed by an email, direct message, mail, or telephone call in which details of the features and benefits of participating in the virtual affinity group are communicated to each eligible individual. The notification may include information for accessing and interacting with the virtual affinity group and, in some embodiments, may include a unique identifier, code or other identifier used to access the virtual affinity group and identify the individual. The information communicated may include instructions for accessing the virtual affinity group (including user names and passwords) as well as information identifying the nature of the insurance benefits available to the individual through their participation in the group.

Pursuant to some embodiments, the communication performed at 410 may be performed by providing a highly segmented list of participants to one or more insurance agents or brokers for use in contacting the participants to make one or more insurance-related offers. For example, a file or feed of data of participants may be provided to agents or brokers in different geographical areas for their use in communicating offers to participants.

Process 400 may be repeated as needed to continue to identify eligible participants. Further, process 400 may include an update process in which additional characteristics are identified. The update process may analyze participants of the group to identify one or more additional characteristics shared by at least a portion of the group which are predicted (or shown) to provide desirable insurance related risk. The update process may result in the addition of one or more required characteristics for inclusion in the group, or it may result in the creation of one or more additional groups. In this manner, embodiments allow the creation of highly targeted groups of individuals who share a common interest or profile and who can receive insurance related offers or information based on those common interests or profiles.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

While the illustrative example presented herein relates to a topic-centric virtual affinity group, embodiments may also be provided which are product or merchant-centric. For example, in a merchant-centric embodiment, specific merchants (such as, for example, a restaurant) may be the subject of a special type of virtual affinity group which involves participants who are patrons of the merchant. Customers who have visited or otherwise are familiar with the merchant may be identified and invited to join or participate in a virtual affinity group associated with the merchant. Those participants may be prompted to provide information about the merchant and their experience with the merchant. In some embodiments, the information solicited may include information used by an insurance company to validate policy data associated with the merchant. As an illustrative example, in the case of a restaurant insured by an insurance provider, customers who have patronized the restaurant may be identified and invited to participate in a virtual affinity group associated with the restaurant. Participants may be prompted to provide information about the restaurant including information about their experience and also information about the restaurant operations and facility. The information about the restaurant operations and facility can be designed to validate or confirm details regarding the restaurant's insurance coverage and policy. For example, participants may be prompted to provide responses to questions such as: whether the restaurant was maintained in a clean condition, whether the restaurant served alcohol, whether the restaurant had a pool table, whether the restaurant had one or more video game machines, or the like. Some or each of these questions may be associated with an insurance underwriting or policy objective, and may be used to validate or update information associated with the insurance policy of the restaurant. The result is an ability to easily collect information from a variety of participants that may be useful in validating or auditing insurance related information.

Although specific hardware and data configurations have been described herein, not that any number of other configurations may be provided in accordance with embodiments of the present invention (e.g., some of the information associated with the databases described herein may be combined or stored in external systems).

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include Dynamic Random Access Memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or Electronically Erasable Programmable Read-Only Memory ("EEPROM"), a FLASH-EEPROM, any other memory chip or cartridge, or any other non-transitory medium from which a computer can read.

Various forms of computer readable media may be involved in carrying one or more sequences of one or more instructions to a processor (such as the processor 275 of FIG. 2, or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computer implemented insurance processing method, comprising:
    receiving, at an insurance processing platform, information defining at least a first characteristic of a virtual affinity group to be created, the at least first characteristic selected from a known insurance underwriting aggregated group;
    creating the virtual affinity group based on the at least first characteristic;
    receiving, at said insurance processing platform, information defining at least a first feature of said virtual affinity group and at least a first insurance related benefit to be offered to said virtual affinity group;
    receiving, at the insurance processing platform, third-party data relating to individuals;
    automatically identifying based on the third-party data relating to the individuals at least a first individual matching said at least first characteristic of the virtual affinity group; and
    updating a virtual affinity group membership data file to include information identifying said at least first individual as being eligible for membership in the virtual affinity group.

2. The computer implemented insurance processing method of claim 1, further comprising:
    receiving an insurance-related inquiry from said at least first individual; and
    adjusting an analysis associated with processing of said insurance-related inquiry based on confirmation that said at least first individual is eligible for membership in the virtual affinity group.

3. The computer-implemented insurance processing method of claim 2, wherein said analysis is at least one of an insurance underwriting analysis and an insurance pricing analysis.

4. The computer implemented insurance processing method of claim 1, further comprising:
    communicating to said at least first individual information allowing said at least first individual to participate in said virtual affinity group.

5. The computer implemented insurance processing method of claim 1, wherein said at least first characteristic is associated with a topic of interest, the topic of interest common to all individuals participating in said virtual affinity group.

6. The computer implemented insurance processing method of claim 5, further comprising:
    receiving information identifying at least a second characteristic of said virtual affinity group, the at least second characteristic identifying at least one of a geographical limitation and a demographic limitation.

7. The computer implemented insurance processing method of claim 1, wherein said at least first feature of said virtual affinity group includes information identifying an Internet address of said virtual affinity group.

8. The computer implemented insurance processing method of claim 1, wherein said automatically identifying at least a first individual further comprises:
    receiving, from at least a first web site, data associated with a plurality of individuals; and
    comparing said data with said information identifying said at least first characteristic to identify at least a first individual having said at least first characteristic.

9. The computer implemented insurance processing method of claim 8, wherein said data is received from said at least first web site via an application programming interface.

10. The computer implemented insurance processing method of claim 8, wherein said data is received from said at least first web site via an RSS feed.

11. The computer implemented insurance processing method of claim 4, wherein said communicating to said at least first individual comprises:
    transmitting instructions to access said virtual affinity group to said at least first individual.

12. The computer implemented insurance processing method of claim 11, wherein said transmitting is performed using at least one of email, postal mail, telephone, SMS messaging, and direct messaging.

13. The computer implemented insurance processing method of claim 1, further comprising:
    receiving, from said at least first individual, a request for said at least first insurance related benefit.

14. The computer implemented method of claim 1, wherein said at least first insurance related benefit is selected based on said information identifying at least a first characteristic of said virtual affinity group.

15. An insurance computer system for creating a virtual affinity group, comprising:
    a processor; and
    a memory in communication with the processor and storing program instructions, the processor operative with the program instructions to:
        receive at least a first characteristic associated with a known insurance underwriting aggregated group;

receive instructions to create a virtual affinity group associated with said at least first characteristic;

receive information defining at least a first feature of said virtual affinity group and at least a first insurance related benefit to be offered to participants of said virtual affinity group;

receive third-party data relating to individuals;

automatically identify, based on the third-party data relating to the individuals, at least a first individual matching said at least first characteristic; and update a virtual affinity group membership data file to include information identifying said at least first individual as eligible for membership in the virtual affinity group.

16. The insurance computer system of claim 15, wherein the processor is further operative with the program instructions to:

receive an insurance-related inquiry from said at least first individual; and adjust an analysis associated with processing of said insurance-related inquiry based on confirmation that said at least first individual is eligible for membership in the virtual affinity group.

17. The insurance computer system of claim 16, wherein said analysis is at least one of an insurance underwriting analysis and an insurance pricing analysis.

18. The insurance computer system of claim 15, wherein the processor is further operative with the program instructions to:

communicate to said at least first individual information allowing said at least first individual to participate in said virtual affinity group.

19. The insurance computer system of claim 15, wherein the processor is further operative with the program instructions to:

analyze information associated with a plurality of individuals having said at least first characteristic to identify at least a second characteristic;

automatically identify at least a second individual matching said at least first and said at least second characteristic; and update said virtual affinity group membership data file to include information identifying said at least second individual as eligible for membership in the virtual affinity group.

20. The insurance computer system of claim 15, wherein the processor is further operative with the program instructions to:

analyze information associated with said virtual affinity group membership data file to identify at least a second characteristic;

create a second virtual affinity group of individuals having both said first and said second characteristics; and automatically identify a plurality of individuals matching both said at least first and said at least second characteristic.

* * * * *